United States Patent [19]

Haase et al.

[11] Patent Number: 4,877,597

[45] Date of Patent: Oct. 31, 1989

[54] METHOD FOR PRODUCING AQUEOUS SOLUTIONS OF BASIC POLY ALUMINUM SULPHATE

[75] Inventors: Dieter Haase, Ste-Catherine; Nelu Spiratos, LaPrairie, both of Canada

[73] Assignee: Handy Chemicals Ltd., LaPrairie, Canada

[21] Appl. No.: 262,320

[22] Filed: Oct. 25, 1988

[51] Int. Cl.$^4$ ................................................. C01F 7/74
[52] U.S. Cl. ..................................... 423/556; 423/128
[58] Field of Search ................................ 423/556, 128

[56] References Cited

U.S. PATENT DOCUMENTS

| | | | |
|---|---|---|---|
| 3,929,666 | 12/1975 | Alba et al. | 423/556 |
| 4,563,342 | 1/1986 | Gunnarsson | 423/556 |
| 4,681,697 | 7/1987 | Doetsch et al. | 423/556 |

FOREIGN PATENT DOCUMENTS

| | | | |
|---|---|---|---|
| 2554218 | 8/1977 | Fed. Rep. of Germany | 423/556 |
| 45-49 | 1/1970 | Japan | 423/556 |

*Primary Examiner*—Gregory A. Heller
*Attorney, Agent, or Firm*—Oblon, Spivak, McClelland, Maier & Neustadt

[57] ABSTRACT

The present invention relates to a process for the preparation of a poly aluminum sulphate product having the following formula:

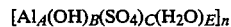

$$[Al_A(OH)_B(SO_4)_C(H_2O)_E]_n$$

in which
n is a positive integer;
A is 1.0;
B ranges from 0.75–2.0;
C ranges from 0.5–1.12; and
E is 1.5 to 4 when the product is in solid form; and
E is larger than 4 when the product is in aqueous form, and wherein
$B+2C=3$, said process comprising reacting an Alum solution with a suitable alkali aluminate under high shear mixing and recovering the desired product.

17 Claims, No Drawings

METHOD FOR PRODUCING AQUEOUS SOLUTIONS OF BASIC POLY ALUMINUM SULPHATE

FIELD OF THE INVENTION

The present invention relates to a novel method for the preparation of basic poly aluminum sulphate.

BACKGROUND OF THE INVENTION

Poly aluminum sulphate is a relatively new product that has been extensively developed over the past few years especially for the field of water purification where it is useful as a flocculating agent.

Various processes for the preparation of poly aluminum sulphate have been developed over the years. Traditional methods follow a partial neutralization of aluminum sulphate (Alum) with hydroxyl groups from lime, caustic soda, soda ash, ammonium hydroxide or other alkali sources to a pH of approximately 3.5 to 4.3. Typically, the pH value tends to be 3.8 because aluminum hydroxide is not precipitated at or below this pH value.

Stabilizers such as phosphates, or chlorides may also be added to partially replace sulphate groups, or alternatively organic complexing agents such as sodium heptonate, citric acid, sorbitol, sodium citrate, sodium tartrate, sodium gluconate and the like may be added separately to stabilize the aqueous poly aluminum sulphate as much as possible. For a good review of the various processes that have been developed over the years for synthesizing poly aluminum sulphate, one may refer to Canadian Pat. Nos. 1,123,306, 1,203,364, 1,203,664 or 1,203,665 and to U.S. Pat. Nos. 4,284,611 and 4,536,384.

For instance, in Canadian Pat. No. 1,203,364, Alum is neutralized with sodium hydroxide to prepare an aluminum hydroxide gel according to the following reaction:

$$4Al_2(SO_4)_3 + 24NaOH \rightarrow 8Al(OH)_3 + 12Na_2SO_4$$

Next, poly aluminum sulphate is prepared from this gel according to the following reaction:

$$8Al(OH)_3 + 4Al_2(SO_4)_3 \rightarrow 4Al_4(OH)_6(SO_4)_3$$

This reaction yields a 50% basic product.

Using this method, 4 moles of poly aluminum sulphate and 12 moles of sodium sulphate by-product are obtained, thereby representing a significantly disadvantage. A further considerable disadvantage of this method is that a "filter cake" of aluminum hydroxide gel must be prepared before the desired product can be synthesized. Therefore, this supposes a two-step process from which large amounts of by-products are obtained.

Canadian Pat. No. 1,203,364 also teaches the neutralization of sodium aluminate with sulfuric acid to produce an amorphous aluminum hydroxide gel according to the following reaction:

$$4Na_2Al_2O_4 + 4H_2SO_4 + 8H_2O \rightarrow 8Al(OH)_3 + 4Na_2SO_4.$$

This gel is then further reacted with Alum to produce basic poly aluminum sulphate. Then for a 50% basic product:

$$8Al(OH)_3 + 4Al_2(SO_4)_3 \rightarrow 4Al_4(OH)_6(SO_4)_3$$

we note that although most of the sodium sulphate is removed from the aluminum hydroxide gel through filtration, it remains nevertheless a wasted and costly by-product. Again, this is a two-step process which is difficult to perform because one must also go through the production of a "filter cake" of aluminum hydroxide gel. This yields 4 moles of by-product per 4 moles of product.

The processes described in the remaining above-mentioned patents, which do not require a prior hydroxide gel formation, still present serious drawbacks. For example, with these processes, it is difficult to produce a concentrated marketable product containing the required typical 7 to 10% of $Al_2O_3$ concentration because diluted alkalies must be added slowly to Alum in order to prevent simultaneous precipitation of aluminum hydroxide. Furthermore, in most instances, by-product losses are considerable. Solutions containing substances such as calcium or sodium sulphate or ammonium sulphate are the by-products that are usually generated when the processes described in the patents cited above are used. Typically, a by-product loss ranging from 20 to 30% by weight depending on basicities produced and sources of alkali used is almost unavoidable.

Mixing and filtration problems are also associated with most of the processes known in the art. For example, when lime is used as the alkali in the process, serious mixing and filtration problems can be encountered. Also, crytallisation problems will unavoidably be encountered when sodium sulphate is formed as a by-product.

Therefore, although the technical advantages of poly aluminum sulphate have been recognized for several years, there are still some serious problems associated with its preparation and handling. It appears that it would be highly desirable to provide a process that would minimize the losses that can be encountered through the production of by-products as well as problems associated with the separation of these by-products.

SUMMARY OF THE INVENTION

In accordance with the present invention, there is provided a novel method for the preparation of a poly aluminum sulphate product having the following general formula:

$$[Al_4(OH)_B(SO_4)_C(H_2O)_E]_n$$

in which
n is a positive integer;
A is 1.0;
B ranges from 0.75–2.0;
C ranges from 0.5–1.12; and
E is 1.5 to 4 when the product is in solid form; and
E is larger than 4 when the product is in aqueous form, and wherein
$B + 2C = 3$.

This method comprises the step of reacting Alum with an alkali aluminate under high shear mixing and recovering the desired product.

The most important advantages resulting from the use of the product of the process of the present invention is the fact that smaller amounts of by-product for given amounts of product are produced and the formation of an aluminum hydroxide gel "filter cake" is avoided.

The method of the present invention represents a clear breakthrough in the preparation of poly aluminum sulphate because it reduces the amount of by-products to approximately 25% of the by-products that were obtained with most of the already existing methods. Furthermore, the major by-product (sodium sulphate) being obtained in lesser amounts, it can be maintained in the final product to enhance its performance since the level of by-product obtained will not lead to crystallisation of sodium sulphate at ambiant temperatures.

The process of the present invention will be more detailed in the following description.

DETAILED DESCRIPTION OF THE INVENTION

The present invention relates to a process for the preparation of poly aluminum sulphate or other poly aluminum compounds of the same generic family.

The product

The product to be prepared in accordance with the present invention is a poly aluminum sulphate having the following general formula:

$$[Al_A(OH)_B(SO_4)_C(H_2O)_E]_n$$

in which
n is a positive integer;
A is 1.0;
B ranges from 0.75–2.0;
C ranges from 0.5–1.12; and
E is 1.5 to 4 when the product is in solid form; and
E is larger than 4 when the product is in aqueous form, and wherein
B+2C=3.

The value of integer n will increase as the basicity of the product increases.

The starting materials

Basically, two starting materials are required to perform the novel process of the present invention. First, aluminum sulphate referred to in the general trade as Alum must be employed. Aluminum sulphate has the following formula: $Al_2(SO_4)_3$. The second starting material is a source of a suitable alkali aluminate. Although sodium aluminate is the preferred starting material, other suitable alkali aluminates may also be contemplated. Water is also necessary since the reaction will be performed in an aqueous medium.

The process

The process for preparing poly aluminum sulphate in the context of the present invention involves a unique batch procedure in which Alum is reacted with an alkali aluminate under "high shear" mixing. Generally speaking, from 5666 to 8719 parts of liquid Alum having a concentration in $Al_2(SO_4)_3$ of 28% is cooled to a temperature that may range between 10° and 35° C. and under "high shear" rate producing a typical peripheral velocity of 20 to 90 feet/second is added from 639 to 1704 parts of liquid alkali aluminate having a concentration of 24% $Al_2O_3$ and 6% free NaOH when the alkali aluminate is sodium aluminate contained in at least 320 to 843 parts of additional water respectively over a period of time typically ranging from ¼ to 1½ hour. The reaction mixture is maintained at a temperature ranging from 10° to 35° C. for a period of time typically ranging from ¼ to 1½ hour after which the reaction temperature is slowly increased to a range that can vary from 50° to 90° C. over a period of time typically ranging from ½ to 2½ hours. This final temperature is then maintained for a period of time typically ranging from ½ to 2 hours or until the mixture becomes clear. Once the resulting mixture is clear, it is cooled to room temperature. It is to be noted that for this reaction, the pH of the solution should be maintained between 2.0 and 3.8.

Alternatively, the alkali aluminate can be added to part of the required amount of Alum, thereby producing a pH ranging from 5 to 9 in order to form a neutralized gel and the remaining required amount of Alum can then be added to form the final reaction product. If the reaction is performed in this fashion, the pH variations during the process will usually vary from 2.0 to 9.0. As for temperatures and mixing times, the temperature, when alkali aluminate is added to Alum, will range between 10° and 35° C. and will range from 35° to 90° C. after the remaining amount of Alum is added to the reaction mixture. Mixing times after addition will typically range from ¼ to 1½ hour for the first half of the reaction and from 1 to 4½ hours for the second half of the reaction.

Another alternative reaction sequence consists in adding a part of the total Alum to the alkali aluminate to form a neutralized gel. This first part of the total amount of Alum should be such as to produce a pH ranging between 5 and 9. The remaining amount of total Alum is then added to the reaction mixture to form the final product. In this case, the pH of the reaction will vary from 14 to 3.7. As for the temperatures, they will range from 10° to 35° C. for the first part of the reaction and from 35° to 90° C. for the second part of the reaction. Mixing times will also vary depending on the performed step. In the first part, the mixing time after addition will typically range from ¼ to 1½ hour while it will range from 1 to 4½ hours in the second part.

It is to be noted that the process described above may also include the addition of substantial amounts of other cations such as those of iron contained in Alum when it is prepared from bauxite. Other cations, whether introduced unentionally or otherwise, may include magnesium, calcium, zinc, zirconium and the like. Furthermore, one may also forsee the optional addition of other anions such as phosphates, chlorides, acetates, borates, carbonates or salts of organic or inorganic acids when added to the basic Alum complex.

In a preferred embodiment of the present invention, from 1022 to 1534 parts of sodium aluminate having a concentration in $Al_2O_3$ of 24% and 6% free NaOH, contained in at least 1244 to 1867 parts of additional water respectively is added to from 6154 to 7620 parts of liquid Alum having a concentration of $Al_2(SO_4)_3$ of 28% and which has been previously cooled to a temperature ranging from 10° to 20° C. It is to be mentioned that sodium aluminate is to be added slowly on a period of time ranging from ½ to ¾ hour under high shear mixing. The resulting mixture is held at a temperature ranging from 10° to 20° C. for a period of time ranging from ½ to ¾ hour after which the temperature is slowly increased to 20° to 70° C. over a period of time ranging from 1 to 2 hours. The mixture is held at this final temperature for ¾ to 1½ hour or until the mixture becomes clear. The resulting mixture is then cooled and ready to use.

The equations describing the reaction for the preparation of poly aluminum sulphate when using Alum and sodium aluminate are as follows for the preparation of a 50% basic Alum:

I
$$3Na_2Al_2O_4 + Al_2(SO_4)_3 + 12H_2O \rightarrow 8Al(OH)_3 + 3Na_2SO_4$$

II $8Al(OH)_3 + 4Al_2(SO_4)_3 \rightarrow 4Al_4(OH)_6(SO_4)_3$ therefore the overall reaction is III
$$3Na_2Al_2O_4 + 5Al_2(SO_4)_3 + 12H_2O \rightarrow 4Al_4(OH)_6(SO_4)_3 + 3Na_2(SO_4)$$

Thus, by using simultaneously acid and alkali aluminum salts, the product:by-product ration obtained is substantially higher than any ratio obtained with previously known methods. Only three moles of sodium sulphate per 4 moles of final product is obtained with the method of the present invention.

One must appreciate that the important feature of the present invention is the use of high shear mixers (homogenizers) which enable the formation of the reactive $Al(OH)_3$ gel at a high solids content. This yields a final transparent liquid product having a concentration of $Al_2O_3$ ranging from 7 to 10% obtained from a unique batch procedure.

The following examples are introduced to illustrate rather than limit the scope of the present invention.

EXAMPLE 1

Preparation of polymeric basic aluminum sulphate.

700 parts of liquid Alum (28% $Al_2(SO_4)_3$) was added to a jacketed 1 L. flask. The mixture was cooled to 15° C. and under high shear mixing, 129 parts liquid sodium aluminate (24.0% $Al_2O_3$) contained in 157 parts of additional water were slowly added over one half hour. The aluminum hydroxide gel mixture was held at 10°–15° C. for one half hour at which time the temperature was slowly increased to 65° C. over two hours. It was held for one and a half hour at 65° C. until the mixture became clear and was then cooled. The product obtained contained 9.2% $Al_2O_3$ (a partial increase over theoretical due to evaporation loss) and had basicity of 50%.

EXAMPLE 2

Preparation of polymeric basic aluminum sulphate.

284 parts water were added to 244 parts of liquid Alum and cooled to 15° C. liquid sodium aluminate (24% $al_2O_3$) 135 parts diluted with 143 parts water was then added over one half hour to a pH of 6.1, the gel was mixed for one half hour under high shear. Alum liquid 456 parts, was then added and the temperature slowly raised over 1½ hour to 58° C. and held at 58° C. for an additional 1½ hour. Upon clearing the product was cooled and contained $Al_2O_3$ 7.0% (partial increase due to evaporation loss) and a basicity of 51.5%.

EXAMPLE 3

Preparation of polymeric basic aluminum sulphate.

To 459 parts water, were added 140 parts sodium aluminate (24.0% $Al_2O_3$). Next 255 parts liquid Alum were added under high mixing at 20° C. over ½ hour. The pH was 5.6 and after ¾ hour of mixing 445 parts of liquid Alum were added, and the temperature was kept at 20° C. for an additional 1½ hour. It was then increased to 58° C. over 1¼ hour and held for ½ hour at which time the mixture became totally clear. The product was cooled and showed a basicity of 52.7% and 7.3% $Al_2O_3$.

EXAMPLE 4

Comparison tests involving Alum and poly aluminum sulphate prepared in accordance with the present invention.

Tests were carried out using Alum or poly aluminum sulphate having a basicity of approximately 50% using water taken from the St-Lawrence river, the treatment being performed at 25° C. and 8° C. The tests were carried out using Alum as a reference and both tests had an $Al_2O_3$ content of 6.9 mg/L. Results are shown in Tables I and II.

TABLE I

|  | ALUM | PAS |
|---|---|---|
| Beaker | 1 | 142 |
| $Al_2O_3$ ppm | 6.9 | 6.9 |
| APP. OF FLOC |  |  |
| Pin Point mins., sec. | 3.00 | 1.30 |
| FLOC FORMATION |  |  |
| 7 minutes | 1 | 2 |
| 15 minutes | 1.5 | 2.5 |
| 20 minutes | 2 | 2.5 |
| Position of floc | D | C |
| Beaker | 1 | 142 |
| ANALYSIS OF OVERFLOW |  |  |
| Turbidity (NTU) | 0.56 | 0.32 |
| Alkalinity (CaCO3) | 37 | 45 |
| pH | 7.04 | 7.34 |

| RAW WATER | AGITATION | SETTLING |
|---|---|---|
| pH 8.46 | 3 min. at 100 rpm | 10 minutes |
| Alkalinity CaCO3 52 | 15 min. at 25 rpm |  |
| Turbidity NTU 2.6 | 10 min. at 5 rpm |  |
| Temperature °C. 8 |  |  |

| FLOC FORMATION |  | SETTLING |  | FLOC POSITION AT 10 RPM |
|---|---|---|---|---|
| No floc | 0 | Nil | 0 | Dispersion D |
| Turbidity | 1 | Poor | 1 | Centre C |
| Pin point | 2 | Slow | 2 |  |
| Good | 3 | Fast | 3 |  |
| Very good | 4 | Very fast | 4 |  |

TABLE II

|  | ALUM | PAS |
|---|---|---|
| Beaker | 1 | 142 2 |
| $Al_2O_3$ ppm | 6.9 | 6.9 |
| APP. OF FLOC |  |  |
| Pin Point mins., sec. | 0.45 | 1.15 |
| FLOC FORMATION |  |  |
| 7 minutes | 2 | 2.5 |
| 13 minutes | 3 | 3 |
| 20 minutes | 3.5 | 3.5 |
| Position of floc | C | C |
| ANALYSIS OF OVERFLOW |  |  |
| Turbidity NTU | 0.29 | 0.32 |
| Alkalinity CaCO3 | 38 | 45 |
| pH | 7.04 | 7.34 |

| RAW WATER | AGITATION | SETTLING |
|---|---|---|
| pH 8.46 | 3 min. at 100 rpm | 10 minutes |
| Alkalinity CaCO3 52 | 15 min. at 25 rpm |  |
| Turbidity NTU 2.6 | 10 min. at 5 rpm |  |
| Temperature °C. 25 |  |  |

| FLOC FORMATION |  | SETTLING |  | FLOC POSITION AT 10 RPM |
|---|---|---|---|---|
| No floc | 0 | Nil | 0 | Dispersion D |

TABLE II-continued

| Turbidity | 1 | Poor | 1 | Centre C |
| --- | --- | --- | --- | --- |
| Pin point | 2 | Slow | 2 | |
| Good | 3 | Fast | 3 | |
| Very good | 4 | Very fast | 4 | |

It is to be noted that in 8° C. water, the residual turbidity of the poly aluminum sulphate prepared in accordance with the present invention is 0.32 NTU while the residual turbidity of Alum was 0.56 NTU. Furthermore, the rate of floc development was faster and the floc larger for the poly aluminum sulphate prepared in accordance with the process of the present invention. Finally, in all cases, the alkalinity of the treated water is higher when poly aluminum sulphate is used relative to Alum. It is also to be noted that at 25° C., even though comparable results are obtained for both products, such warm waters are not frequently treated.

We claim:

1. A process for the preparation of a basic poly aluminum sulphate solution having the following formula:

$$[Al_A(OH)_B(SO_4)_C(H_2O)_E]_n$$

in which
n is a positive integer;
A is 1.0;
B ranges from 0.75-2.0;
C ranges from 0.5-1.12; and
E is larger than 4 when the product is in aqueous form, wherein the basicity of said basic poly aluminum sulfate solution is defined as $B/3A \times 100$ and said basicity is 25-66% and wherein
$B + 2C = 3$
said process comprising the step of reacting in a one step process an aluminum sulphate solution with an alkali metal aluminate solution under high shear mixing conditions sufficient to produce a reactive $Al(OH)_3$ gel and to produce a transparent basic poly aluminum sulfate solution and recovering the desired product.

2. The process of claim 1, wherein the alkali aluminate is sodium aluminate.

3. The process of claim 1, wherein said aluminum sulfate is reacted with the alkali metal aluminate at a temperature ranging between 10° and 35° C. and is subsequently heated at a temperature ranging from 50° to 90° C.

4. The process of claim 1, wherein said basic poly aluminum sulfate solution contains additional multivalent cations.

5. The process of claim 4, wherein said multivalent cations are selected from the group consisting of iron, magnesium, calcium, zinc and zirconium.

6. The process of claim 1, wherein said basic poly aluminum sulfate solution contains additional anions selected from the group consisting of salts of organic and inorganic acids, such that the ratio C/A is greater than 0.5, but less than 1.12.

7. The process of claim 6, wherein said anions are selected from the group consisting of phosphate, acetate, borate, chloride and carbonate anions.

8. The process of claim 2, wherein said basicity is from 40-60% and the pH of said reaction mixture is maintained between 2.0 and 3.8.

9. The process of claim 2, wherein said basicity is 50-52.7%.

10. The process of claim 1, wherein said aluminum sulphate solution and said alkali aluminate solution are initially mixed under high shear turbulence.

11. The process of claim 1, wherein said aluminum sulfate solution is 3.8-8.3 wt. % in $Al_2O_3$.

12. The process of claim 1, wherein said alkali metal aluminate solution is 5.6-16 wt. % in $Al_2O_3$.

13. The process of claim 1, wherein during said reacting step, the pH of the resulting reaction mixture is maintained between 2.0 and 3.8.

14. The process of claim 2, wherein from 5666 to 8719 parts by weight of said aluminum sulfate solution having a concentration in aluminum sulfate of 28% is reacted with from 639 to 1704 parts by weight of said sodium aluminate solution having a concentration of 24 wt. % in $Al_2O_3$ and 6% free NaOH contained in from 320 to 843 parts by weight water.

15. The process of claim 2, wherein from 6154 to 7620 parts by weight of said aluminum sulfate solution having a concentration in aluminum sulfate of 28% is reacted with 1022 to 1534 parts by weight of said sodium aluminate solution having a concentration of 24 wt. % in $Al_2O_3$ and 6 wt. % free NaOH contained in from 1244 to 1867 parts of water, wherein the basicity of said basic poly aluminum sulfate solution is between 40-60%.

16. The process of claim 1, wherein said reacting step is conducted under high shear mixing conditions producing a peripheral velocity of 20-90 feet/second through a predetermined opening size.

17. The process of claim 1, wherein said basic poly aluminum sulfate solution is 7-10 wt. % in $Al_2O_3$.

* * * * *

UNITED STATES PATENT AND TRADEMARK OFFICE
CERTIFICATE OF CORRECTION

PATENT NO.  : 4,877,597
DATED       : OCTOBER 31, 1989
INVENTOR(S) : DIETER HAASE ET AL

It is certified that error appears in the above-identified patent and that said Letters Patent is hereby corrected as shown below:

Column 1, line 40, change "24NaOH)" to --24NaOH--;

line 50, change "significantly" to --significant--;

line 62, change "+4Na$_2$" to --+4Na$_2$SO$_4$--;

line 63, delete "SO$_4$".

Column 2, line 64, change "use of the product of the process" to --use of the process--.

Column 5, line 16, change "ration" to --ratio--.

Column 6, line 9, change "Alum or poly" to --Alum and poly--;

line 27, delete "Beaker    1      142".

Signed and Sealed this

Fifteenth Day of September, 1992

Attest:

DOUGLAS B. COMER

Attesting Officer    Acting Commissioner of Patents and Trademarks